Patented Dec. 9, 1952

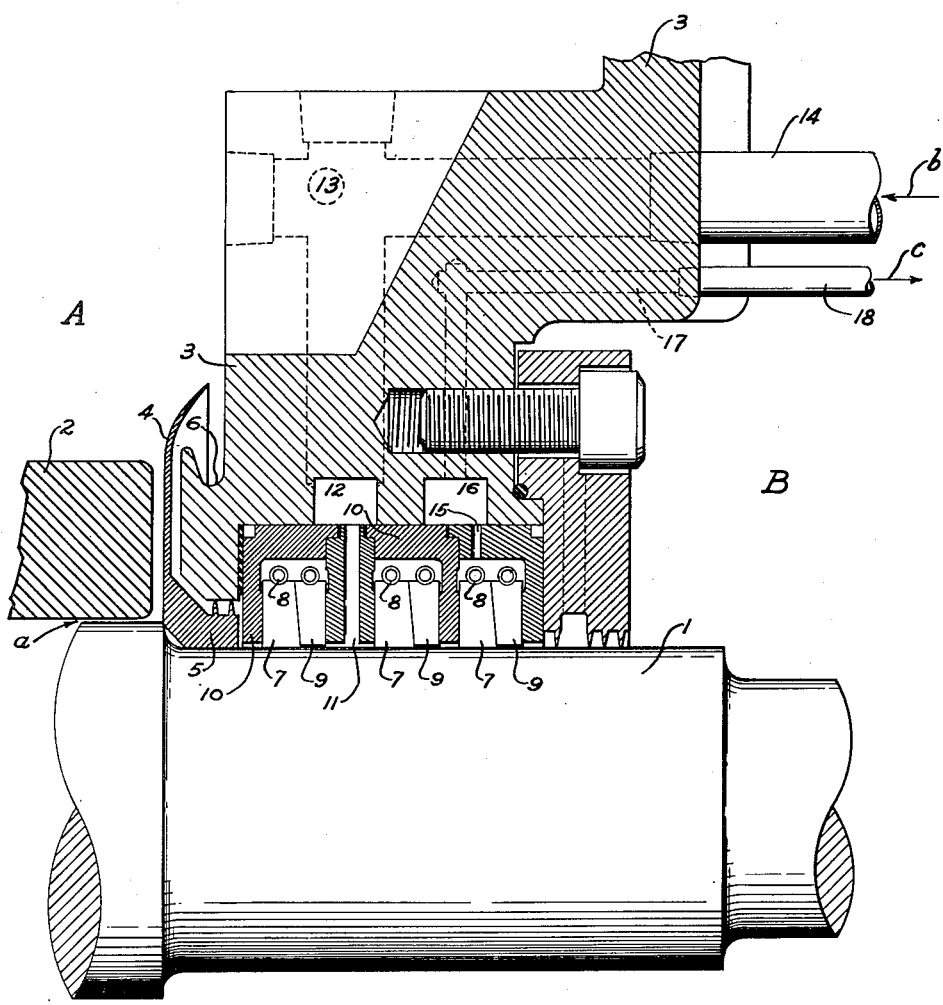

2,621,087

UNITED STATES PATENT OFFICE 2,621,087

ROTATING SHAFT SEAL MEANS

Friedrich H. Kluge, Olean, N. Y., assignor, by mesne assignments, to Dresser Operations, Inc., Whittier, Calif., a corporation of California Application April 20, 1950, Serial No. 156,973

2 Claims. (Cl. 308—36.3)

This invention relates to sealing means for the impeller shaft of a centrifugal compressor, and in like locations in like machines.

More particularly, the invention contemplates such a machine wherein the shaft has a bearing located within a pressure chamber such as within an impeller casing adjacent the inlet or outlet end thereof, and a lubricant is supplied to the bearing against the chamber pressure, in sufficient volume to provide substantially cooling of the bearing.

The general object of the invention is to provide a seal for the casing wall adjacent such bearing, for preventing leakage of both liquid and gaseous contents of the bearing chamber.

Further objects and advantages will be apparent from the following description taken in connection with the accompanying drawing, which is a somewhat conventionalized view of pertinent portions of an embodiment of the invention, parts being broken away to show details of construction as in typical section thereof.

With reference now to the drawing, 1 is a rotor shaft supported and driven at high speed in a bearing 2. The bearing 2 is located adjacent wall means 3 which may be an end portion of a casing housing impellers or other rotors mounted on the shaft 1 but not appearing in the drawing. At any rate, the arrangement is such that the bearing 2 is located within a chamber A confining a gas at substantial pressure, such chamber being at least partially bounded by the wall means 3, the opposite face of the wall means 3 being subject to atmospheric pressure B and the shaft 1 extending from its bearing 2, through the wall means.

The bearing 2 in operation is served with liquid lubricant as indicated by the arrow $a$, in substantial volume to have coolant as well as lubricant effect, and, of course, at a pressure sufficient to overcome the gaseous pressure within the chamber A; such arrangement being well known in the art.

Means are provided for preventing leakage of both gas and liquid from the chamber A along the shaft 1 through the wall 3 to the outside B. For such dual purpose according to this invention I provide on the shaft 1 between the bearing 2 and the wall 3, a slinger ring 4 having a hub portion 5 fixed on the shaft 1 as by press fit with the thin integral concentric annular disc portion 6 extending radially therefrom and thereabout and preferably being slightly dished to inturn toward the wall 3. The wall 3 adjacent the slinger ring 4 is provided with a trough 6 in the plane of the slinger ring extremity to receive and lead away liquid discharged from the slinger ring.

The wall 3 has sealing means effective about the shaft 1 between the faces of the wall. For the purpose as here shown the wall is provided with an annular groove of substantial size opening toward the shaft 1 in which are located assemblies of sealing parts including three sets of carbon rings 7 spring backed as at 8 and bearing against the shaft 1, with auxiliary rings 9 cooperative therewith for the purpose. These parts are located within suitable cage means generally indicated at 10, completing fit within the annular groove about the shaft, details of the cage means arrangement being not material here but the general arrangement being known in the art.

According to this invention, I provide a number of radially extending passageways 11 in the cage means 10, and an annular cavity 12 in the wall 3, the passageways 11 extending radially from the shaft 1 between the pair of sealing rings 7 nearest the chamber A and communicating with the cavity 12. In the wall 3 are communicating drilled passages indicated in broken lines as at 13 leading from an outside connection 14 to the cavity 12.

The connection 14 is served with a gas which is inert with respect to both the gas and the lubricant within the chamber A, at a pressure slightly greater or at least not less than that within the chamber A; as indicated by the arrow $b$.

According to this invention provision may also be made for egress of such neutral gas from within the wall 3 beyond the outermost set of sealing rings 7. For such purpose one or more passageways 15 may be provided in the cage means 10 adjacent the outer face of the wall, and the wall provided with an annular cavity 16 communicating with said passages 15 and drilled as indicated in broken lines at 17, to an outlet connection 18.

The outlet connection may be served by an evacuator to maintain pressure within the chamber 16 sufficiently low that there will be no leakage of the inert gas along the shaft 1 to atmosphere at B; there being thus inert gas egress as indicated by the arrow $c$.

By the arrangement described, there will be no leakage along the shaft 1 through the wall 3, of either liquid or gas from the pressure chamber A to the atmosphere B.

I claim:

1. In a machine of the class described including a rotating shaft extending through wall means adjacent a bearing for said shaft, said bearing being located in a high pressure gas chamber partially bounded by said wall means and being served with liquid lubricant and coolant, said wall means being subject to atmospheric pressure on its face remote from said chamber: slinger ring means on said shaft between said bearing and said wall means, said wall means having a pair of sealing parts in axially spaced relation between its faces, and a cavity about the shaft, and means associated with said cavity to maintain therein neutral gas at pressure not less than the bearing chamber pressure.

2. In a machine of the class described including a rotating shaft extending through wall means adjacent a bearing for said shaft, said bearing being located in a high pressure gas chamber partially bounded by said wall means and being served with liquid lubricant and coolant, said wall means being subject to atmospheric pressure on its face remote from said chamber: slinger ring means on said shaft between said bearing and said wall means, said wall means having sealing parts between its faces providing a pair of cavities spaced from each other along the shaft, means associated with the cavity, adjacent said bearing chamber, to maintain therein neutral gas at pressure not less than the bearing chamber pressure, and said wall means having means providing gas egress from the other of said cavities.

FRIEDRICH H. KLUGE.

REFERENCES CITED

The following references are of record in the file of this patent:

UNITED STATES PATENTS

| Number | Name | Date |
|---|---|---|
| 1,737,870 | Telfer | Dec. 3, 1929 |
| 1,810,370 | Ray | June 16, 1931 |
| 2,254,862 | Watson | Sept. 2, 1941 |
| 2,266,407 | Bruestle | Dec. 16, 1941 |

FOREIGN PATENTS

| Number | Country | Date |
|---|---|---|
| 308,722 | Great Britain | of 1930 |